(12) United States Patent
Albano et al.

(10) Patent No.: US 6,750,295 B2
(45) Date of Patent: Jun. 15, 2004

(54) FLUOROELASTOMERIC COMPOSITIONS

(75) Inventors: Margherita Albano, Milan (IT); Marco Apostolo, Novara (IT); Stefano Arrigoni, Novara (IT)

(73) Assignee: Ausimont S.p.A., Milan (IT)

( * ) Notice: Subject to any disclaimer, the term of this patent is extended or adjusted under 35 U.S.C. 154(b) by 0 days.

(21) Appl. No.: 10/151,960

(22) Filed: May 22, 2002

(65) Prior Publication Data

US 2003/0060568 A1 Mar. 27, 2003

(30) Foreign Application Priority Data

May 22, 2001 (IT) .................................... MI2001A1060

(51) Int. Cl.$^7$ ............................ C08L 27/00; C08L 27/12
(52) U.S. Cl. ........................................ 525/199; 524/520
(58) Field of Search ............................. 525/199; 524/520

(56) References Cited

U.S. PATENT DOCUMENTS

| | | | |
|---|---|---|---|
| 3,752,787 A | 8/1973 | De Brunner | |
| 3,876,654 A | 4/1975 | Pattison | |
| 4,035,565 A | 7/1977 | Apotheker et al. | 526/249 |
| 4,233,427 A | 11/1980 | Bargain et al. | 525/478 |
| 4,243,770 A | 1/1981 | Tatemoto et al. | 525/331 |
| 4,259,463 A | 3/1981 | Moggi et al. | 525/331 |
| 4,564,662 A | 1/1986 | Albin | 526/247 |
| 4,694,045 A | 9/1987 | Moore | 525/276 |
| 4,745,165 A | 5/1988 | Arcella et al. | 526/247 |
| 4,789,717 A | 12/1988 | Giannetti et al. | 526/209 |
| 4,864,006 A | 9/1989 | Giannetti et al. | 526/209 |
| 4,943,622 A | 7/1990 | Naraki et al. | 526/206 |
| 5,173,553 A | 12/1992 | Albano et al. | 526/238 |
| 5,523,346 A | 6/1996 | Wu | 524/805 |
| 5,616,648 A | 4/1997 | Wu | 524/805 |
| 5,625,019 A | 4/1997 | Arcella et al. | 526/247 |
| 6,310,142 B1 * | 10/2001 | Apostolo et al. | 525/200 |
| 6,395,834 B1 * | 5/2002 | Albano et al. | 525/199 |

FOREIGN PATENT DOCUMENTS

| | | |
|---|---|---|
| EP | 0 136 596 A2 | 10/1985 |
| EP | 0 199 138 A2 | 10/1986 |
| EP | 0 335 705 A1 | 4/1989 |
| EP | 0 410 351 A1 | 1/1991 |
| EP | 0 583 186 A | 11/1995 |
| EP | 0 684 277 A1 | 11/1995 |
| EP | 0 769 520 A1 | 4/1997 |
| EP | 0 860 436 A1 | 8/1998 |
| EP | 0 979 832 A1 | 2/2000 |
| EP | 0 969 027 A1 | 5/2000 |
| EP | 1 031 507 A | 8/2000 |
| EP | 1 031 606 A1 | 8/2000 |
| WO | WO 97/05122 | 2/1997 |

OTHER PUBLICATIONS

European Search Report EP 02 01 0916; Jan. 14, 2003.

* cited by examiner

*Primary Examiner*—Nathan M. Nutter
(74) *Attorney, Agent, or Firm*—Arent Fox PLLC

(57) ABSTRACT

Fluoroelastomeric compositions comprising:

A) a fluoroelastomeric matrix based on vinylidene fluoride (VDF);

B) a semi-crystalline fluoropolymer, in an amount from 1 to 40% by weight based on the total of A)+B), comprising a semi-crystalline fluoropolymer core coated by a semi-crystalline fluoropolymer shell containing bromine and/or iodine in the polymer chain;

the fluoroelastomer A) incorporates the fluoropolymer B), the fluoropolymer B) being formed by tetrafluoroethylene (TFE) homopolymers, or by TFE copolymers with one or more monomers containing at least one unsaturation of ethylene type, the average sizes of the semi-crystalline fluoropolymer particles being from 10 to 100 nm, preferably from 10 to 60 nm.

19 Claims, No Drawings

FLUOROELASTOMERIC COMPOSITIONS

The present invention relates to fluoroelastomeric compositions consisiting essentially of a VDF-based fluoroelastomer and a semi-crystalline fluoropolymer, having improved mechanical properties, combined with high chemical and thermal resistance, good sealing properties (improved compression set) and usable for sealing manufactured articles, pipes, in particular for food industry applications.

Specifically, the present invention relates to fluoroelastomeric compositions comprising a VDF-based fluoroelastomeric matrix which incorporates semi-crystalline fluoropolymer particles, characterized by improved mechanical and elastomeric (sealing) properties and improved surface aspect, roughnesses free. Said combination of properties makes available fluoroelastomers usable in the food field wherein the fluoroelastomer manufactured articles must show a low release of polluting agents.

It is known to increase the fluoroelastomer mechanical properties, reinforcing fillers can be added to the fluoroelastomeric matrix. In this way improved mechanical properties are obtained, but the release of polluting agents is too high, when the fluoroelastomer is to be used in the preparation of manufactured articles for the food industry.

Preferably in food industry one does not wish to use carbon black as reinforcing agent to avoid the polluting agent release, and manufactured articles without fillers are preferred to make easier the control of the equipment cleaning.

By trying to replace the carbon black filler with a semi-crystalline fluoropolymer, for example polytetrafluoroethylene (PTFE) powder, there are many difficulties in its incorporation, without the possibility to prepare a homogeneous compound between the semi-crystalline fluoropolymer and the fluoroelastomer, in particular when the semicrytalline fluoropolymer amount is high. Generally, to obtain a satisfactory homogeneization of the semi-crystalline fluoropolymer in the fluoroelastomer, it is necessary to use complicated technologies, using open mixers with complicated incorporation cycles, for example by heating the rolls and using several steps. Even operating with these extremely complicated technologies, the incorporation of the semi-crystalline fluoropolymer in the fluoroelastomer is not uniform and the manufactured article shows poor mechanical properties (in particular the stress/elongation ratio) and poor reproducibility of the results, whereby there is poor reliability of the preparation process and a high number of pieces to be discarded. Besides, the final manufactured article is not homogeneous due to the poor disperdibility of the semi-crystalline fluoropolymer.

From the European patent application EP 1,031,606 it is known to incorporate under the latex form a semi-crystalline fluoropolymer containing iodine and/or bromine atoms, in a fluoroelastomer to improve the mechanical properties with respect to a fluoroelastomer filled with PTFE powder. The particles of the semi-crystalline fluoropolymer latex have sizes comprised between 10 and 100 nm. In said patent application it is stated that the use of a semi-crystalline fluoropolymer latex containing iodine and/or bromine allows to improve the mechanical properties with respect to the case of absence of iodine and/or bromine. In the Examples the introduction of iodine atoms by using iodinated transfer agents is reported. However, for the applications in food industry the mechanical properties are not suitable. In said patent application it is stated that iodine and/or bromine deriving from comonomers in the preparation of the semi-crystalline fluoropolymer can be used. The comonomer amounts are such that the comonomer content in the final compound results lower than 2 moles per 100 moles of the other monomeric units of the semi-crystalline fluoropolymer. No Examples are reported with these iodinated and/or brominated comonomers in the polymer chain. Tests carried out by the Applicant have shown that even operating in above way no fluoroelastomeric compositions suitable for food industry applications are obtained since endowed with poor mechanical and sealing properties (see the comparative Examples).

The need was felt to have available fluoroelastomeric compositions having the following combination of properties:
- improved mechanical properties; in particular improved stress/elongation at break ratio;
- high chemical and thermal resistance;
- excellent surface aspect, roughnesses free;
- working easiness in equipments conventionally used in the fluoroelastomer field, without using complicated technologies for incorporation of fluoropolymer.
- improved sealing properties (improved compression set).

The Applicant has unexpectedly and surprisingly found that it is possible to obtain the combination of the above properties by using the specific compositions defined hereunder.

An object of the present invention are therefore fluoroelastomeric compositions comprising:
A) a fluoroelastomeric matrix based on vinylidene fluoride (VDF);
B) a semi-crystalline fluoropolymer, in an amount from 1 to 40% by weight based on the total of A)+B), preferably from 5 to 35% by weight, comprising a semi-crystalline fluoropolymer core coated by a semi-crystalline fluoropolymer shell containing bromine and/or iodine in the polymer chain, the amount of brominated and/or iodinated comonomer being from >2% to 10% by moles per 100 moles of the other basic monomeric units of the semi-crystalline fluoropolymer B) core+shell;
the fluoroelastomer A) incorporates the fluoropolymer B), the fluoropolymer B) being formed by tetrafluoroethylene (TFE) homopolymers, or by TFE copolymers with one or more monomers containing at least one unsaturation of ethylene type, in an amount from 0.01% to 10% by moles, preferably from 0.05% to 7% by moles; the core and the shell of the fluoropolymer B) can be of a different composition between each other, the average sizes of the semi-crystalline fluoropolymer B) particles being from 10 to 100 nm, preferably from 10 to 60 nm.

By semi-crystalline fluoropolymer a fluoropolymer is meant which shows, besides the glass transition temperature Tg, at least one melting temperature.

The fluoroelastomeric compositions of the invention are obtainable by mixing the latex of the semi-crystalline fluoropolymer B) with the latex of the fluoroelastomer A) and subsequent coagulation.

Alternatively to the latex mixing, the fluoroelastomeric compositions of the invention can be obtained in the same reactor, using two subsequent steps: in the first step the semi-crystalline fluoropolymer B) having the above nanometric sizes is polymerized, while in the second step the fluoroelastomer A) is polymerized. By operating in this way the fluoroelastomer A) covers the latex particles of semi-crystalline fluoropolymer B) allowing to obtain a very good disperdibility of the latter in the fluoroelastomer.

The semi-crystalline fluoropolymer B) particles having the above nanometric sizes are obtainable for example by polymerization in aqueous microemulsion of perfluoropolyoxyalkylenes as described for example in European patent application 969,027 in the name of the Applicant, herein incorporated by reference. Polymerization techniques in microemulsion wherein the oil phase is formed by polymerizable unsaturated monomers can also be used, as described in U.S. Pat. No. 5,523,346 and U.S. Pat. No. 5,616,648.

The Applicant has found that to obtain the results of the invention it is essential that the semi-crystalline fluoropolymer B) has the mentioned nanometric sizes, while the size of the fluoroelastomer A) particles to be mixed with the fluoropolymer is not critical.

The semi-crystalline fluoropolymers of the present invention comprise a semi-crystalline fluoropolymer core shelled by a semi-crystalline fluoropolymer containing in the polymer chain bromine and/or iodine atoms. The introduction of said bromine and/or iodine atoms can be carried out by addition in the polymerization mixture of the (co)monomers forming the fluoropolymer B), of brominated and/or iodinated comonomers, such as bromo-olefins having from 2 to 10 carbon atoms, as described for example in U.S. Pat. No. 4,035,565 and U.S. Pat. No. 4,694,045, U.S. Pat. No. 5,625,019, or bromo and/or iodo fluoroalkylvinylethers, as described in U.S. Pat. No. 4,745,165, U.S. Pat. No. 4,564,662 and EP 199,138, in such amounts whereby the content of brominated and/or iodinated comonomers in the final polymer B) is generally from >2 to 10% by moles per 100 moles of the other basic monomeric units as above said, preferably from 2.5 to 6%.

Optionally, in combination with said comonomers, it is possible to introduce bromine and/or iodine end atoms by addition to the reaction mixture of brominated and/or iodinated polymer chain transfer agents, such as for example described in U.S. Pat. No. 4,243,770 and U.S. Pat. No. 4,943,622, U.S. Pat. No. 5,173,553.

It has been unexpectedly found by the Applicant, see the comparative Examples, that the combination of properties of the invention compositions is obtainable only if the semi-crystalline fluoropolymer B) is present in the indicated amounts. In fact if amounts higher than 40% by weight with respect to the composition A)+B) are used, the hardness and the compression set of the obtained composition are not suitable for the food industry. Furthermore, the fluoropolymer B) is prepared by using on the fluoropolymer shell a brominated and/or iodinated comonomer in an amount higher than 2% by moles with respect to the other basic monomeric units as above said. Tests carried out by the Applicant have shown that by operating under the conditions reported in the Examples of European patent application 1,031,606, wherein the semi-crystalline fluoropolymer does not contain bromine and/or iodine in the polymer chain, the combination of the above properties is not obtained (see the Examples).

The preparation of the fluoroelastomers A) of the composition of the present invention can be carried out by copolymerization of the monomers in aqueous emulsion, according to known methods of the prior art, in the presence of radical initiators, for example alkaline or ammonium persulphates, perphosphates, perborates or percarbonates, optionally in combination with ferrous, cuprous or silver salts, or of other easily oxidizable metals. In the reaction medium also surfactants of various types are usually present, among which fluorinated surfactants are particularly preferred.

The polymerization reaction is generally carried out at temperatures in the range 25°–150° C., under a pressure up to 10 MPa.

The preparation of the fluoroelastomeric matrix is preferably carried out in microemulsion of (per)fluoropolyoxyalkylenes, according to U.S. Pat. No. 4,789,717 and U.S. Pat. No. 4,864,006.

When the semi-crystalline fluoropolymer B) present in the fluoroelastomeric compositions of the invention is based on modified PTFE, i.e. it contains at least one comonomer, for its preparation comonomers having an ethylene unsaturation both of hydrogenated and fluorinated type can be used. Among the hydrogenated ones, ethylene, propylene, acrylic monomers, for example methylmethacrylate, (meth)acrylic acid, butylacrylate, hydroxyethylhexylacrylate, styrene monomers can be mentioned.

Among fluorinated comonomers, it can be mentioned:

$C_3$–$C_8$ perfluoroolefins, such as hexafluoropropene (HFP), hexafluoroisobutene;

$C_2$–$C_8$ hydrogenated fluoroolefins, such as vinyl fluoride (VF), vinylidene fluoride (VDF), trifluoroethylene, perfluoroalkylethylene $CH_2=CH-R_f$, wherein $R_f$ is a $C_1$–$C_6$ perfluoroalkyl;

$C_2$–$C_8$ chloro-fluoroolefins, such as chlorotrifluoroethylene (CTFE);

(per)fluoroalkylvinylethers (PAVE) $CF_2=CFOR_f$, wherein $R_f$ is a $C_1$–$C_6$ (per)fluoroalkyl, for example $CF_3$, $C_2F_5$, $C_3F_7$;

(per)fluoro-oxyalkylvinylethers $CF_2=CFOX$, wherein X is: a $C_1$–$C_{12}$ alkyl, or a $C_1$–$C_{12}$ oxyalkyl, or a $C_1$–$C_{12}$ (per)fluoro-oxyalkyl having one or more ether groups, for example perfluoro-2-propoxy-propyl; fluorodioxoles, preferably perfluorodioxoles;

fluorovinylethers (MOVE) of general formula $CFX_{AI}=CX_{AI}OCF_2OR_{AI}$ (A-I) wherein $R_{AI}$ is a $C_2$–$C_6$ linear, branched, or $C_5$–$C_6$ cyclic (per)fluoroalkyl group, or a $C_2$–$C_6$ linear, branched (per)fluorooxyalkyl group containing from one to three oxygen atoms; when $R_{AI}$ is a fluoroalkyl or a fluorooxyalkyl group as above defined it can contain from 1 to 2 atoms, equal or different, selected from the following: H, Cl, Br, I; $X_{AI}$=F, H; the compounds of general formula $CFX_{AI}=CX_{AI}OCF_2OCF_2CF_2Y_{AI}$ (A-II) wherein $Y_{AI}$=F, $OCF_3$; $X_{AI}$ as above are preferred; in particular (MOVE I) $CF_2=CFOCF_2OCF_2CF_3$ (A-III) and (MOVE II) $CF_2=CFOCF_2OCF_2CF_2OCF_3$ (A-IV) are preferrred.

PAVES, in particular perfluoromethyl-, ethyl-, propylvinylether, MOVEs, in particular MOVE I and MOVE II, and fluorodioxoles, preferably perfluorodioxoles, are preferred comonomers.

The fluoroelastomers A) used in the present invention are VDF-based copolymers, wherein VDF is copolymerized with at least a comonomer selected from the following:

$C_2$–$C_8$ perfluoroolefins, such as tetrafluoroethylene (TFE), hexafluoropropene (HFP);

$C_2$–$C_8$ chloro- and/or bromo- and/or iodo-fluoroolefins, such as chlorotrifluoroethylene (CTFE) and bromotrifluoroethylene;

(per)fluoroalkylvinylethers (PAVE) $CF_2=CFOR_f$, wherein $R_f$ is a $C_1$–$C_6$ (per)fluoroalkyl, for example trifluoromethyl, bromodifluoromethyl, pentafluoropropyl;

perfluoro-oxyalkylvinylethers $CF_2=CFOX$, wherein X is a $C_1$–$C_{12}$ perfluorooxyalkyl, having one or more ether groups, for example perfluoro-2-propoxy-propyl;

fluorovinylethers (MOVE) of general formula $CFX_{AI}=CX_{AI}OCF_2OR_{AI}$ (A-I) wherein $R_{AI}$ is a $C_2$–$C_6$ linear, branched or $C_5$–$C_6$ cyclic (per)fluoroalkyl group, or a $C_2$–$C_6$ linear, branched (per)fluorooxyalkyl group containing from one to three oxygen atoms; when $R_{AI}$ is a fluoroalkyl or a fluorooxyalkyl group as above it can contain from 1 to 2 atoms, equal or different, selected from the following: H, Cl, Br, I; $X_{AI}$=F, H; the compounds of general formula: $CFX_{AI}$=$CX_{AI}OCF_2OCF_2CF_2Y_{AI}$ (A-II) wherein $Y_{AI}$=F, $OCF_3$; $X_{AI}$ as above are preferred; in particular (MOVE I) $CF_2$=$CFOCF_2OCF_2CF_3$ (A-III) and (MOVE II) $CF_2$=$CFOCF_2OCF_2CF_2OCF_3$ (A-IV) are preferred;

$C_2$–$C_8$ non fluorinated olefins (Ol), for example ethylene and propylene.

Preferred compositions, in % by moles, of the monomers which form the basic structure of the fluoro-elastomer, are the following, being 100% the sum of the molar percentages of the monomers:

(a) vinylidene fluoride (VDF) 45–85%, hexafluoropropene (HFP) 15–45%, tetrafluoroethylene (TFE) 0–30%; $C_2$–$C_8$ non fluorinated olefins (Ol) 0–30%;

(b) vinylidene fluoride (VDF) 45–85%, perfluoroalkylvinylether (PAVE) and/or fluorovinylethers (MOVE) 15–55%, tetrafluoroethylene (TFE) 0–30%;

(c) vinilydene fluoride (VDF) 15–40%, $C_2$–$C_8$ non fluorinated olefins (Ol) 5–30%, hexafluoropropene (HFP) and/or perfluoroalkylvinylether (PAVE) 15–30%, tetrafluoroethylene (TFE) 10–30%;

(d) vinylidene fluoride (VDF) 5–30%, perfluoroalkylvinylether (PAVE) and/or fluorovinylethers (MOVE) 15–55%, tetrafluoroethylene (TFE) 33–75%;

(e) vinylidene fluoride (VDF) 5–30%, tetrafluoroethylene (TFE) 45–65%, $C_2$–$C_8$ non fluorinated olefins (Ol) 20–55%.

Optionally the fluoroelastomeric matrix comprises also monomeric units deriving from a bis-olefin having general formula:

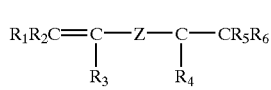

(II)

wherein:

$R_1$, $R_2$, $R_3$, $R_4$, $R_5$, $R_6$, equal to or different from each other, are H or $C_1$–$C_5$ alkyls;

Z is a $C_1$–$C_{18}$ linear or branched alkylene or cycloalkylene radical, optionally containing oxygen atoms, preferably at least partially fluorinated, or a (per)fluoropolyoxyalkylene radical, as described in EP 661,304 in the name of the Applicant.

The amount of units in the polymer chain deriving from said bis-olefins is generally in the range 0.01–1.0% by moles, preferably 0.03–0.5% by moles, still more preferably 0.05–0.2% by moles per 100 moles based on the total of the other above mentioned monomeric units which form the basic structure of the fluoroelastomer.

The compositions of the present invention can be cured by peroxidic or ionic route or by the combination of the two techniques. For crosslinking by peroxidic or mixed route, the fluoroelastomers A) contain in the polymer chain and/or in terminal position of the macromolecules iodine and/or bromine atoms. The introduction in the fluoroelastomeric matrix of said iodine and/or bromine atoms can be obtained by addition of brominated and/or iodinated "cure-site" comonomers, such as bromo and/or iodo olefins having from 2 to 10 carbon atoms, as described for example in U.S. Pat. No. 4,035,565 and U.S. Pat. No. 4,694,045, or of iodo and/or bromo fluoroalkylvinylethers, as described in U.S. Pat. No. 4,745,165, U.S. Pat. No. 4,564,662 and EP 199,138, in such amounts that the cure-site comonomer content in the final compound is generally in the range 0.05–4 moles per 100 moles of the other basic monomeric units.

Other usable iodinated compounds are the triiodinated ones derived from triazines as described in European patent application EP 860,436 and in European patent application 979,832.

In alternative or also in combination with the "cure-site" comonomers, it is possible to introduce in the fluoroelastomer A) iodine and/or bromine end atoms by addition to the reaction mixture of iodinated and/or brominated polymer chain transfer agents, such as for example the compounds of formula $R_f(I)_x(Br)_y$, wherein $R_f$ is a (per)fluoroalkyl or a (per)fluorochloroalkyl having from 1 to 8 carbon atoms, while x and y are integers comprised between 0 and 2, with $1 \leq x+y \leq 2$ (see for example U.S. Pat. No. 4,243,770 and U.S. Pat. No. 4,943,622). It is also possible to use as polymer chain transfer agents iodides and/or bromides of alkaline or alkaline-earth metals, according to U.S. Pat. No. 5,173,553.

In combination with the polymer chain transfer agents containing iodine and/or bromine, other polymer chain transfer agents known in the prior art, such as ethyl acetate, diethylmalonate, etc., can be used.

Curing by peroxidic route is carried out, according to known techniques, by addition of a suitable peroxide capable to generate radicals by thermal decomposition. Among the most commonly used we remember: dialkyl peroxides, such as for example di-terbutyl-peroxide and 2,5-dimethyl-2,5-di(terbutylperoxy)hexane; dicumyl peroxide; dibenzoyl peroxide; diterbutyl perbenzoate; di[1,3-dimethyl-3-(terbutylperoxy)butyl]carbonate. Other peroxidic systems are described, for example, in European patent applications EP 136,596 and EP 410,351.

To the curing blend other compounds are then added, such as:

(a) curing coagents, in amounts generally in the range 0.5–10%, preferably 1–7% by weight with respect to the polymer; among them there are usually used: triallylcyanurate; triallyl-isocyanurate (TAIC); tris (diallylamine)-s-triazine; triallylphosphite; N,N-diallyl-acrylamide; N,N,N',N'-tetraallyl-malonamide; trivinyl-isocyanurate; 2,4,6-trivinyl-methyltrisiloxane, etc.; TAIC is particularly preferred;

other preferred crosslinking agents are the bis-olefins described in EP 769,520.

Other crosslinking agents which can be used are triazines described in European patent application EP 860,436 and in European patent application WO97/05122;

(b) optionally a metal compound, in amounts in the range 1–15%, preferably 2–10%, by weight with respect to the polymer, selected from oxides or hydrooxides of divalent metals, such as for example Mg, Zn, Ca, optionally combined with a weak acid salt, such as for example stearates, benzoates, carbonates, oxalates or phosphites of Na, K, Ca;

(c) other conventional additives, such as thickening fillers, pigments, antioxidants, stabilizers and the like.

Curing by ionic route is carried out by addition of curing and accelerating agents well known in the prior art. The accelerating agent amounts are in the range 0.05–5 phr, the curing agent in the range 0.5–15 phr, preferably 1–6 phr.

As curing agents, aromatic or aliphatic polyhydroxylated compounds or their derivatives can be used, as described for example in EP 335,705 and U.S. Pat. No. 4,233,427. Among them we remember in particular: bisphenols, wherein the two aromatic rings are linked each other by an aliphatic, cycloaliphatic or aromatic bivalent radical, or by one oxygen atom, or also by a carbonyl group. In particular bisphenol AF is preferred.

As accelerating agents it can be used for example: quaternary ammonium or phosphonium salts (see for example EP 335,705 and U.S. Pat. No. 3,876,654); aminophosphonium salts (see for example U.S. Pat. No. 4,259,463); phosphoranes (see for example U.S. Pat. No. 3,752,787). Quaternary phosphonium salts and aminophosphonium salts are preferred.

Instead of using the accelerating agent and the curing agent separately, it can also be used from 1 to 5 phr (preferred from 2 to 4.5) of an adduct between an accelerating and a curing agent in molar ratio from 1:2 to 1:5, preferably from 1:3 to 1:5, the accelerating agent being one of the onium-organic compounds having a positive charge, as above defined, the curing agent being selected from the above compounds, in particular di- or polyhydroxy compounds; the adduct being obtained by melting the reaction compound between the accelerating agent and the curing agent in the mentioned molar ratios, or by melting the mixture of the adduct 1:1 added with the curing agent in the indicated amounts. Optionally also an excess of the accelerating agent with respect to that contained in the adduct can be present, generally in amounts from 0.05 to 0.5 phr.

For the preparation of the adduct, particularly preferred as cations are: 1,1-diphenyl-1-benzyl-N-diethyl-phosphoranamine and tetrabutyl phosphonium; among the anions bisphenol compounds are particularly preferred wherein the two aromatic rings are linked by a bivalent radical selected from the perfluoroalkyl groups having from 3 to 7 carbon atoms, and the OH are in para position.

The adduct preparation is described in European patent application in the name of the Applicant EP 684,277 herein incorporated by reference.

The curable blend furthermore contains:
i) one or more acceptors of inorganic acids selected from those known in ionic curing of vinylidene fluoride copolymers, in amounts 1–40 parts for 100 parts of fluoroelastomeric copolymer;
ii) one or more basic compounds selected from those known in the ionic curing of vinylidene fluoride copolymers in amounts from 0.5 to 10 parts per 100 parts of fluoroelastomeric copolymer.

The basic compounds ii) are commonly selected from the group formed by $Ca(OH)_2$, metal salts of weak acids, such as for example carbonates, benzoates, oxalates and phosphites of Ca, Na and K and mixtures of the aforesaid hydroxides with the aforesaid metal salts; among the compounds of the type i), MgO can be mentioned.

The indicated amounts of the components of the compounds are referred to 100 phr of copolymer or terpolymer of the invention. To the curing blend other conventional additives, such as thickeners, pigments, antioxidants, stabilizers and the like can then be added.

As preferred curing according to the present invention, the peroxidic one is used.

The present invention will be better illustrated by the following Examples, which have a merely indicative and not limitative purpose of the scope of the invention itself.

EXAMPLES

Example 1

Preparation of the Invention Composition Containing 35% of Semi-Crystalline Fluoropolymer B) Having a Brominated Comonomer Content Equal to 2.5% by Moles of Comonomer Based on the Total of the Monomeric Units of the Fluoropolymer B)

a) Preparation of the Semi-Crystalline Fluoropolymer B) Latex

In a 10 l autoclave, equipped with stirrer working at 545 rpm there were introduced, after evacuation, 6.5 l of demineralized water and 260 ml of a microemulsion of perfluoropolyoxyalkylenes previously obtained by mixing:

56.4 ml of a perfluoropolyoxyalkylene having an acid end group of formula:

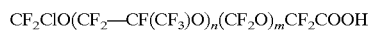
$CF_2ClO(CF_2\text{—}CF(CF_3)O)_n(CF_2O)_mCF_2COOH$ wherein n/m=10, having average molecular weight of 600;

56.4 ml of an aqueous solution of $NH_4OH$ at 30% by volume;

112.8 ml of demineralized water;

34.4 ml of Galden® D02 having the formula:

$CF_3O(CF_2\text{—}CF(CF_3)O)_n(CF_2O)_mCF_3$ wherein n/m=20, having average molecular weight of 450.

The autoclave was then heated up to 80° C. and maintained at said temperature for the whole reaction. The autoclave was brought to the pressure of 0.6 bar (0.06 MPa) with ethane and then up to the pressure of 20 bar (2 MPa) with a monomeric mixture formed by 6.5% by moles of perfluoromethylvinylether (PMVE) and 93.5% by moles of tetrafluoroethylene (TFE).

0.13 g of ammonium persulphate (APS) were then introduced into the autoclave as initiator. Starting from 75% of the monomer conversion, 150 g (equivalent to 2.5% by moles with respect to the other monomeric units of the fluoropolymer B)) of bromoethylheptafluorovinylether (BVE) $CF_2\text{=}CF\text{—}OCF_2CF_2Br$ are fed in five steps, for every 5% increase of the monomer conversion.

During the reaction the pressure is maintained at 20 bar by continuously feeding the following monomeric mixture: 2% by moles of PMVE and 98% of TFE.

After 160 minutes of reaction, corresponding to 100% of the monomer conversion, the autoclave was cooled and the latex discharged. The latex properties are reported in Table 1.

b) Preparation of the Fluoroelastomer A) Latex

In a 10 l autoclave, equipped with stirrer working at 545 rpm, there were introduced, after evacuation, 6.5 l of demineralized water and 67 ml of a microemulsion of perfluoropolyoxyalkylenes previously obtained by mixing:

14.5 ml of a perfluoropolyoxyalkylene having an acid end group of formula:

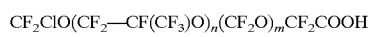
$CF_2ClO(CF_2\text{—}CF(CF_3)O)_n(CF_2O)_mCF_2COOH$ wherein n/m=10, having average molecular weight of 600;

14.5 ml of an aqueous solution of $NH_4OH$ at 30% by volume;

29 ml of demineralized water;

9 ml of Galden® D02 having the formula:

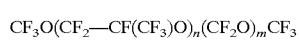
$CF_3O(CF_2\text{—}CF(CF_3)O)_n(CF_2O)_mCF_3$ wherein n/m=20, having average molecular weight of 450.

The autoclave was then heated up to 80° C. and maintained at said temperature for the whole reaction. The following mixture of monomers was then fed:

| vinilydene fluoride (VDF) | 48% by moles |
|---|---|
| hexafluoropropene (HFP) | 45% by moles |
| tetrafluoroethylene (TFE) | 7% " | so as to bring the pressure up to 30 bar (3 MPa).

In the autoclave there were then introduced:

0.32 g of ammonium persulphate (APS) as initiator;

21 g of 1,6-diiodoperfluorobutane ($C_4F_8I_2$) as polymer chain transfer agent; the addition was carried out in 3 aliquots, the first equal to 3.2 g at the beginning of the polymerization, the second one equal to 9.4 g at 20% of conversion, the third one equal to 8.4 g at 80% of conversion;

10 g of bis-olefin of formula $CH_2=CH-(CF_2)_6-CH=CH_2$; the addition was carried out in 20 aliquots, each of 0.5 g starting from the beginning of the polymerization and for every 5% increase in the monomer conversion.

The 30 bar pressure was maintained constant for the whole polymerization by feeding a mixture formed by:

| vinilydene fluoride (VDF) | 70% by moles |
|---|---|
| hexafluoropropene (HFP) | 19% by moles |
| tetrafluoroethylene (TFE) | 11% " |

After 160 minutes of reaction, corresponding to 100% of the monomer conversion, the autoclave was cooled and the latex discharged. The latex properties are reported in Table 1.

c) Mixing of the Latexes and Preparation of the Invention Composition

The latex obtained in a) was mixed with the latex prepared in b) so as to obtain an amount of semi-crystalline polymer equal to 35% by weight with respect to the total weight of A)+B). After mixing the latex is coagulated with a solution of aluminum sulphate (6 g of $Al_2(SO_4)_3$ for each liter of latex) and dried at 90° C. in an air circulating oven for 16 hours. 1,000 g of the invention composition were obtained, which was characterized for the mechanical properties in Table 2.

The mixing of the composition of Example 1 with the crosslinking agents was carried out in an open mixer commonly used to mix fluoroelastomers. The plates obtained by moulding of the composition of Example 1 show a very smooth surface, roughnesses free.

Example 2

Preparation of the Invention Composition Containing 35% of Semi-Crystalline Fluoropolymer B) having a Brominated Comonomer Content Equal to 5% by Moles of comonomer Based on the Total of the Monomeric Units of the Fluoropolymer B)

a) Preparation Latex of the Semi-Crystalline Fluoropolymer B) Latex

Example 1 is repeated but using an amount of bromovinylether in the preparation of the fluoropolymer B) equal to 300 g.

b) Preparation of the Fluoroelastomer A) Latex

The procedure of Example 1 is repeated.

c) Mixing of the Latexes and Preparation of the Invention Composition

The procedure described in Example 1 is repeated, obtaining 1,000 g of polymer.

The latex properties are reported in Table 1. The characterization of the invention composition (mechanical properties) is reported in Table 2.

The mixing of the composition of Example 2 with the crosslinking agents was carried out in an open mixer commonly used to mix fluoroelastomers. The plates obtained by moulding of the composition of Example 2 show a very smooth surface, roughnesses free.

Example 3

Preparation of the Invention Composition Containing 35% of Semi-Crystalline Fluoropolymer B) having a Brominated Comonomer Content Equal to 2.5% by Moles of Comonomer Based on the Total of the Monomeric Units of the Fluoropolymer B), Using a Fluoroelastomer A) Having a Different Composition From That of the Previous Examples a) Preparation of the Semi-Crystalline Fluoropolymer B) Latex Example 1 is repeated.

b) Preparation of the Fluoroelastomer A) Latex

In a 10 l autoclave, equipped with stirrer working at 545 rpm there were introduced, after evacuation, 6.5 l of demineralized water and 67 ml of a microemulsion of perfluoropolyoxyalkylenes previously obtained by mixing:

14.5 ml of a perfluoropolyoxyalkylene having an acid end group of formula:

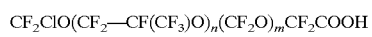

$$CF_2ClO(CF_2-CF(CF_3)O)_n(CF_2O)_mCF_2COOH$$

wherein n/m=10, having average molecular weight of 600;

14.5 ml of an aqueous solution of $NH_4OH$ at 30% by volume;

29 ml of demineralized water;

9 ml of Galden® D02 having the formula:

$$CF_3O(CF_2-CF(CF_3)O)_n(CF_2O)_mCF_3$$

wherein n/m=20, having average molecular weight of 450.

The autoclave was then heated up to 80° C. and maintained at said temperature for the whole reaction. The following mixture of monomers was then fed:

| vinilydene fluoride (VDF) | 17% by moles |
|---|---|
| hexafluoropropene (HFP) | 70% by moles |
| tetrafluoroethylene (TFE) | 13% " | so as to bring the pressure up to 30 bar (3 MPa).

In the autoclave there were then introduced:

0.32 g of ammonium persulphate (APS) as initiator;

20 g of 1,6-diiodoperfluorobutane ($C_4F_8I_2$) as polymer chain transfer agent; the addition was carried out in 3 aliquots, the first equal to 3 g at the beginning of the polymerization, the second one equal to 9 g at 20% of conversion, the third one equal to 8 g at 80% of conversion;

10 g of bis-olefin of formula $CH_2=CH-(CF_2)_6-CH=CH_2$; the addition was carried out in 20 aliquots, each of 0.5 g starting from the beginning of the polymerization and for every 5% increase in the monomer conversion.

The 30 bar pressure was maintained constant for the whole polymerization by feeding a mixture formed by:

| | |
|---|---|
| vinilydene fluoride (VDF) | 50% by moles |
| hexafluoropropene (HFP) | 25% by moles |
| tetrafluoroethylene (TFE) | 25% " |

After 180 minutes of reaction, corresponding to 100% of the monomer conversion, the autoclave was cooled and the latex discharged. The latex properties are reported in Table 1.

c) Mixing of the Latexes and Preparation of the Invention Composition

The procedure described in Example 1 is repeated, obtaining 1,000 g of polymer.

The latex properties are reported in Table 1. The characterization of the invention composition (mechanical properties) is reported in Table 2.

The mixing of the composition of Example 3 with the crosslinking agents was carried out in an open mixer commonly used to mix fluoroelastomers. The plates obtained by moulding of the composition of Example 3 show a very smooth surface, roughnesses free.

Example 4 (Comparative)

Preparation of a Composition Containing 35% of Semi-Crystalline Fluoropolymer B) not Containing Bromine a) Preparation of the Semi-Crystalline Fluoropolymer B) Latex In a 10 l autoclave, equipped with stirrer working at 545 rpm there were introduced, after evacuation, 6.5 l of demineralized water and 260 ml of a microemulsion of perfluoropolyoxyalkylenes previously obtained by mixing:

- 56.4 ml of a perfluoropolyoxyalkylene having an acid end group of formula:

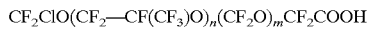

$CF_2ClO(CF_2-CF(CF_3)O)_n(CF_2O)_mCF_2COOH$ wherein n/m=10, having average molecular weight of 600;
- 56.4 ml of an aqueous solution of $NH_4OH$ at 30% by volume;
- 112.8 ml of demineralized water;
- 34.4 ml of Galden® D02 having the formula:

$CF_3O(CF_2-CF(CF_3)O)_n(CF_2O)_mCF_3$ wherein n/m=20, having average molecular weight of 450.

The autoclave was then heated up to 80° C. and maintained at this temperature for the whole reaction. The autoclave was brought to the pressure of 0.6 bar (60 Kpa) with ethane and then up to the pressure of 20 bar (2 MPa) with a monomeric mixture formed by 6.5% by moles of perfluoromethylvinylether (PMVE) and 93.5% by moles of tetrafluoroethylene (TFE).

0.13 g of ammonium persulphate (APS) were then introduced into the autoclave as initiator.

During the reaction the pressure is maintained at 20 bar by continuously feeding the following monomeric mixture: 2% by moles of PMVE and 98% of TFE.

After 45 minutes of reaction, the autoclave was cooled and the latex discharged. The latex properties are reported in Table 1.

b) Preparation of the Fluoroelastomer A) Latex

The procedure of Example 1 is repeated.

c) Mixing of the Latexes and Preparation of the Final Composition

The procedure of Example 1 is repeated, obtaining 1,000 g of polymer.

The latex properties are reported in Table 1. The mechanical properties of the polymer are reported in Table 2.

Example 4a (Comparative)

Preparation of a Composition Containing 35% of Semi-Crystalline Fluoropolymer B), Obtained in the Presence of an Iodinated Transfer Agent a) Preparation of the Semi-Crystalline Fluoropolymer B) Latex Example 1 was repeated, but using instead of bromovinylether an amount equal to 3 g of iodinated transfer agent $C_6F_{12}I_2$.

b) Preparation of the Fluoroelastomer A) Latex

The procedure of Example 1 is repeated.

c) Mixing of the Latexes and Preparation of the Final Composition

The procedure of Example 1 is repeated, obtaining 1,000 g of polymer.

The latex properties are reported in Table 1. The polymer mechanical properties are reported in Table 2.

Example 5 (Comparative)

Preparation of a Composition Containing 35% of Semi-Crystalline Fluoropolymer B) Having a Brominated Comonomer Content Equal to 1.2% by Moles of Comonomer Based on the Total of the Monomeric Units of the Fluoropolymer B)

a) Preparation of the Semi-Crystalline Fluoropolymer B) Latex

Example 1 is repeated but using an amount of bromovinylether in the preparation of the fluoropolymer B) equal to 75 g.

b) Preparation of the Fluoroelastomer A) Latex

The procedure of Example 1 is repeated.

c) Mixing of the Latexes and Preparation of the Final Composition

The procedure described in Example 1 is repeated, obtaining 1,000 g of polymer.

The latex properties are reported in Table 1. The characterization of the invention composition (mechanical properties) is reported in Table 2.

Example 5a (Comparative)

Preparation of a Composition Containing 50% by Weight of Semi-Crystalline Fluoropolymer B) Containing 2.5% by Moles of Brominated Comonomer Based on the Total of the Monomeric Units of the Fluoropolymer B)

a) Preparation of the Semi-Crystalline Fluoropolymer B) Latex

Example 1 is repeated.

b) Preparation of the Fluoroelastomer A) Latex

The procedure of Example 1 is repeated.

c) Mixing of the Latexes

The latex obtained in a) was mixed with the latex prepared in b) so to obtain an amount of semi-crystalline polymer equal to 50% by weight with respect to the total weight of A)+B). After mixing the latex is coagulated with a solution of aluminum sulphate (6 g of $Al_2(SO_4)_3$ for each liter of latex) and dried at 90° C. in an air circulating oven for 16 hours. 1,000 g of the invention composition were obtained, which was characterized for the mechanical properties in Table 2.

Example 6

Preparation of a Composition of the Invention Containing 35% of Semi-Crystalline Fluoropolymer B) Having an Iodinated Comonomer Content Equal to 2.5% by Moles of Comonomer Based on the Total of the Monomeric Units of the Fluoropolymer B)

a) Preparation of the Semi-Crystalline Fluoropolymer B) Latex

In a 10 l autoclave, equipped with stirrer working at 545 rpm there were introduced, after evacuation, 6.5 l of demineralized water and 260 ml of a microemulsion of perfluoropolyoxyalkylenes previously obtained by mixing:

56.4 ml of a perfluoropolyoxyalkylene having an acid end group of formula:

$$CF_2ClO(CF_2-CF(CF_3)O)_n(CF_2O)_mCF_2COOH$$

wherein n/m=10, having average molecular weight of 600;

56.4 ml of an aqueous solution of NH$_4$OH at 30% by volume;

112.8 ml of demineralized water;

34.4 ml of Galden® D02 having the formula:

$$CF_3O(CF_2-CF(CF_3)O)_n(CF_2O)_mCF_3$$

wherein n/m=20, having average molecular weight of 450.

The autoclave was then heated up to 80° C. and maintained at this temperature for the whole reaction. The autoclave was brought to the pressure of 0.6 bar (0.06 MPa) with ethane and then up to the pressure of 20 bar (2 MPa) with a monomeric mixture formed by 6.5% by moles of perfluoromethylvinylether (PMVE) and 93.5% by moles of tetrafluoroethylene (TFE).

0.13 g of ammonium persulphate (APS) were then introduced into the autoclave as initiator. Starting from the 75% of the monomer conversion, 170 g (equivalent to 2.5% by moles with respect to the other monomeric units of the fluoropolymer B)) of an iodo-olefin of formula CH$_2$=CH—(CF$_2$)$_6$I are fed in five steps, for every 5% increase of the monomer conversion.

During the reaction the pressure is maintained at 20 bar by continuously feeding the following monomeric mixture: 2% by moles of PMVE and 98% of TFE.

After 180 minutes of reaction, corresponding to 100% of the monomer conversion, the autoclave was cooled and the latex discharged. The latex properties are reported in Table 1.

b) Preparation of the Fluoroelastomer A) Latex

The procedure of Example 1 is repeated.

c) Mixing of the Latexes and Preparation of the Final Composition

The procedure described in Example 1 is repeated, finally obtaining 1,000 g of polymer.

The latex properties are reported in Table 1. The characterization of the invention composition (mechanical properties) is reported in Table 2.

The mixing of the composition of Example 6 with the crosslinking agents was carried out in an open mixer commonly used to mix fluoroelastomers. The plates obtained by moulding of the composition of Example 6 show a very smooth surface, roughnesses free.

TABLE 1

| Examples | solid/latex (g/l) | Particle diameter (nm) | MFI[1] ASTM D 1238 | Mooney (1 + 10)$^{121° C.}$ ASTM D1646 |
|---|---|---|---|---|
| 1 | | | | |
| Fluoroel.A | 360 | 70 | — | 52 |
| Polymer B | 270 | 40 | 40 | — |
| 2 | | | | |
| Fluoroel.A | 360 | 70 | — | 52 |
| Polymer B | 270 | 40 | 100 | — |
| 3 | | | | |
| Fluoroel.A | 350 | 65 | — | 49 |
| Polymer B | 270 | 40 | 40 | — |
| 4 comp. | | | | |
| Fluoroel.A | 360 | 70 | — | 50 |
| Polymer B | 200 | 30 | 10 | — |
| 4a comp. | | | | |
| Fluoroel.A | 360 | 70 | — | 50 |
| Polymer B | 130 | 13 | 20 | — |
| 5 comp. | | | | |
| Fluoroel.A | 360 | 70 | — | 50 |
| Polymer B | 270 | 35 | 50 | — |
| 5a comp. | | | | |
| Fluoroel.A | 360 | 70 | — | 52 |
| Polymer B | 270 | 40 | 40 | — |
| 6 comp. | | | | |
| Fluoroel.A | 360 | 70 | — | 52 |
| Polymer B | 200 | 35 | 15 | — |

[1]MFI was measured at 372° C. with 2.16 Kg

TABLE 2

| EXAMPLES | | 1 | 2 | 3 | 4 comp | 4a comp | 5 comp | 5a comp | 6 |
|---|---|---|---|---|---|---|---|---|---|
| % by weight polymer B) in A) +B) | | 33 | 33 | 33 | 33 | 33 | 33 | 50 | 33 |
| Formulation: | | | | | | | | | |
| Comp. A) +B) | phr | 100 | 100 | 100 | 100 | 100 | 100 | 100 | 100 |
| TAIC 100% | " | 2.1 | 2.1 | 2.1 | 2.1 | 2.1 | 2.1 | 2.1 | 2.1 |
| Luperco 101 XL (100%) | " | 1 | 1 | 1 | 1 | 1 | 1 | 1 | 1 |

TABLE 2-continued

| EXAMPLES | | 1 | 2 | 3 | 4 comp | 4a comp | 5 comp | 5a comp | 6 |
|---|---|---|---|---|---|---|---|---|---|
| MDR (177° C., 12') (ASTM D6204-97): | | | | | | | | | |
| ML | Lbf.in. | 3.5 | 5.2 | 4.1 | 3.5 | 3 | 2.9 | 11 | 5.2 |
| MH | " | 27 | 33 | 26.3 | 22.6 | 23 | 24 | 48 | 35 |
| Ts2 | sec | 32 | 24 | 20.6 | 28 | 24 | 35 | 21 | 21 |
| T' 90 | " | 98 | 88 | 80 | 134 | 141 | 119 | 75 | 82 |
| Mechanical properties after post-cure at 200° C. for 1 + 1 h (ASTM D412-83) | | | | | | | | | |
| M100 | Mpa | 4.5 | 6.7 | 4.6 | 2.1 | 4 | 3.8 | 9.9 | 10 |
| Stress at break | " | 16 | 17.8 | 16.1 | 13.5 | 14 | 15.7 | 16 | 21 |
| Elong. at break | % | 350 | 260 | 315 | 504 | 411 | 457 | 300 | 225 |
| Shore A hardness | " | 75 | 77 | 81 | 68 | 73 | 73 | 91 | 77 |
| Compression set 200° C. for 70 h | | | | | | | | | |
| O-ring (ASTM D 395) | % | 60 | 57 | 60 | 69 | 63 | 63 | 74 | 52 |

What is claimed is:

1. Fluoroelastomeric compositions comprising:
   A) a fluoroelastomeric matrix based on vinylidene fluoride (VDF);
   B) a semi-crystalline fluoropolymer, in an amount from 1 to 40% by weight based on the total of A)+B), comprising a semi-crystalline fluoropolymer core coated by a semi-crystalline fluoropolymer shell containing bromine and/or iodine in the polymer chain, the amount of brominated and/or iodinated comonomer being from >2% to 10% by moles per 100 moles of the other basic monomeric units of the semi-crystalline fluoropolymer B) core+shell;
   the fluoroelastomer A) incorporates the fluoropolymer B), the fluoropolymer B) being formed by tetrafluoroethylene (TFE) homopolymers, or by TFE copolymers with one or more monomers containing at least one unsaturation of ethylene type, in an amount from 0.01% to 10% by moles; the core and the shell of the fluoropolymer B) can be different from each other, the average sizes of the semi-crystalline fluoropolymer particles being from 10 to 100 nm.

2. Compositions according to claim 1, wherein the semi-crystalline fluoropolymer B) comprises comonomers having an ethylene unsaturation both of hydrogenated and fluorinated type.

3. Compositions according to claim 2, wherein the fluorinated comonomers are selected from the following:
   $C_3$–$C_8$ perfluoroolefins;
   $C_2$–$C_8$ hydrogenated fluoroolefins;
   $C_2$–$C_8$ chloro-fluoroolefins;
   $CF_2$=$CFOR_f$(per)fluoroalkylvinylethers (PAVE), wherein $R_f$ is a $C_1$–$C_6$ (per)fluoroalkyl;
   (per)fluoro-oxyalkylvinylethers $CF_2$=CFOX, wherein X is: $C_1$–$C_{12}$ alkyl, or $C_1$–$C_{12}$ oxyalkyl, or $C_1$–$C_{12}$ (per)fluoro-oxyalkyl having one or more ether groups;
   fluorovinylethers (MOVE) of general formula $CFX_{AI}$=$CX_{AI}OCF_2OR_{AI}$ (A-I) wherein $R_{AI}$ is a $C_2$–$C_6$ linear, branched or $C_5$–$C_6$ cyclic (per)fluoroalkyl group, or a $C_2$–$C_6$ linear, branched (per)fluorooxyalkyl group containing from one to three oxygen atoms; when $R_{AI}$ is a fluoroalkyl or a fluorooxyalkyl group as above defined it can contain from 1 to 2 atoms, equal or different, selected from the following: H, Cl, Br, I; $X_{AI}$=F, H; the compounds of general formula $CFX_{AI}$=$CX_{AI}OCF_2OCF_2CF_2Y_{AI}$ (A-II) wherein $Y_{AI}$=F, $OCF_3$.

4. Compositions according to claim 3, wherein the comonomers are selected among PAVES, MOVEs, and fluorodioxoles.

5. Compositions according to claim 1, wherein the fluoroelastomers A) are VDF-based copolymers, wherein VDF is copolymerized with at least a comonomer selected from the following:
   $C_2$–$C_8$ perfluoroolefins;
   $C_2$–$C_8$ chloro- and/or bromo- and/or iodo-fluoroolefins;
   (per) fluoroalkylvinylethers (PAVE) $CF_2$=$CFOR_f$, wherein $R_f$ is a $C_1$–$C_6$ (per) fluoroalkyl;
   perfluoro-oxyalkylvinylethers $CF_2$=CFOX, wherein X is a $C_1$–$C_{12}$ perfluorooxyalkyl, having one or more ether groups;
   fluorovinylethers (MOVE) of general formula $CFX_{AI}$=$CX_{AI}OCF_2OR_{AI}$ (A-I) wherein $R_{AI}$ is a $C_2$–$C_6$ linear, branched or $C_5$–$C_6$ cyclic (per) fluoroalkyl group, or a $C_2$–$C_6$ linear, branched (per) fluorooxyalkyl group containing from one to three oxygen atoms; when $R_{AI}$ is a fluoroalkyl or a fluorooxyalkyl group as above defined it can contain from 1 to 2 atoms, equal or different, selected from the following: H, Cl, Br, I; $X_{AI}$=F, H;
   $C_2$–$C_8$ non-fluorinated olefins (Ol).

6. Fluoroelastomeric compositions according to claim 1, wherein the compositions of the monomer blends, expressed as % by moles, which form the basic structure of the fluoroelastomer, are the following, being 100% the sum of the molar percentages of the monomers:
   (a) vinylidene fluoride (VDF) 45%–85%, hexafluoropropene (HFP) 15–45%, tetrafluoroethylene (TFE) 0–30%; $C_2$–$C_8$ non fluorinated olefins (Ol) 0–30%;
   (b) vinylidene fluoride (VDF) 45–85%, perfluoroalkylvinylether (PAVE) and/or fluorovinylethers (MOVE) 15–55%, tetrafluoroethylene (TFE) 0–30%;
   (c) vinylidene fluoride (VDF) 15–40%, $C_2$–$C_8$ non fluorinated olefins (Ol) 5–30%, hexafluoropropene (HFP) and/or perfluoroalkylvinylether (PAVE) 15–30%, tetrafluoroethylene (TFE) 10–30%;

(d) vinylidene fluoride (VDF) 5–30%, perfluoroalkylvinylether (PAVE) and/or fluorovinylethers (MOVE) 15–55%, tetrafluoroethylene (TFE) 33–75%;

(e) vinylidene fluoride (VDF) 5–30%, tetrafluoroethylene (TFE) 45–65%, $C_2$–$C_8$ non fluorinated olefins (Ol) 20–55%.

7. Compositions according to claim 5, wherein the fluoroelastomeric matrix comprises monomeric units deriving from a bis-olefin having general formula:

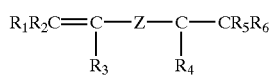

(II)

wherein:

$R_1$, $R_2$, $R_3$, $R_4$, $R_5$, $R_6$, equal to or different from each other, are H or $C_1$–$C_5$ alkyls;

Z is a $C_1$–$C_{18}$ linear or branched alkylene or cycloalkylene radical, optionally containing oxygen atoms, optionally at least partially fluorinated, or a (per) fluoropolyoxyalkylene radical, the amount of the units in the polymer chain deriving from said bis-olefins being in the range 0.01–1.0% by moles, per 100 moles based on the total of the other monomeric units.

8. Fluoroelastomeric compositions according to claim 1, obtainable by mixing of the semi-crystalline fluoropolymer B) latex with the fluoroelastomer A) latex and subsequent coagulation.

9. Fluoroelastomeric compositions according to claim 1, obtainable in a same reactor, using two subsequent steps: in the first step the semi-crystalline fluoropolymer B) is polymerized, while in the second step the fluoroelastomer A) is polymerized.

10. Compositions according to claim 1, cured by peroxidic or ionic route or by the combination of the two techniques.

11. A process for sealing manufactured articles comprising utilizing the fluoroelastomeric compositions according to claim 1.

12. Compositions according to claim 1, wherein the semi-crystalline fluoropolymer is present in an amount from 5 to 35% by weight.

13. Compositions according to claim 1, wherein the fluoropolymer B) is present in an amount from 0.05% to 7% by moles.

14. Compositions according to claim 1, wherein the average sizes of the semi-crystalline fluoropolymer particles is from 10 to 60 nm.

15. Compositions according to claim 3, wherein the fluorovinylethers (MOVE) are selected from (MOVE I) $CF_2=CFOCF_2OCF_2CF_3$ (A-III) or (MOVE II) $CF_2=CFOCF_2OCF_2CF_2OCF_3$ (A-IV).

16. Compositions according to claim 5, wherein the fluorovinylethers (MOVE) are selected from the compounds of general formula: $CFX_{AI}=CX_{AI}OCF_2OCF_2CF_2Y_{AI}$ (A-II) wherein $Y_{AI}=F$, $OCF_3$.

17. Compositions according to claim 5, wherein the fluorovinylethers (MOVE) are selected from (MOVE I) $CF_2=CFOCF_2OCF_2CF_3$ (A-III) or (MOVE II) $CF_2=CFOCF_2OCF_2CF_2OCF_3$ (A-IV).

18. Compositions according to claim 7, wherein the amount of the units in the polymer chain deriving from said bis-olefins is in the range 0.03–0.5% by moles per 100 moles based on the total of the other monomeric units.

19. Compositions according to claim 7, wherein the amount of the units in the polymer chain deriving from said bis-olefins is in the range 0.05–0.2% by moles per 100 moles based on the total of the other monomeric units.

* * * * *